United States Patent
Daech

(10) Patent No.: US 6,451,443 B1
(45) Date of Patent: Sep. 17, 2002

(54) CHROMIUM-FREE CONVERSION COATING

(75) Inventor: Alfred F. Daech, Gretna, LA (US)

(73) Assignee: University of New Orleans Research and Technology Foundation, Inc., New Orleans, LA (US)

( * ) Notice: Subject to any disclaimer, the term of this patent is extended or adjusted under 35 U.S.C. 154(b) by 0 days.

(21) Appl. No.: 09/511,181

(22) Filed: Feb. 22, 2000

Related U.S. Application Data

(60) Provisional application No. 60/120,611, filed on Feb. 19, 1999.

(51) Int. Cl.[7] .............................................. B32B 15/00
(52) U.S. Cl. ................. 428/472; 428/472.1; 428/472.2; 148/273; 148/275; 148/285
(58) Field of Search ................................ 148/273, 275, 148/385; 428/472, 472.1, 472.2

(56) References Cited

U.S. PATENT DOCUMENTS

| | | | | |
|---|---|---|---|---|
| 3,945,899 A | * | 3/1976 | Nikaido et al. ............. | 204/181 |
| 5,582,654 A | * | 12/1996 | Mansfield et al. .......... | 148/273 |
| 5,756,218 A | * | 5/1998 | Buchheit et al. ............ | 428/469 |
| 6,248,184 B1 | * | 6/2001 | Dull et al. .................. | 148/275 |

FOREIGN PATENT DOCUMENTS

| | | | |
|---|---|---|---|
| JP | 04302296 | * | 10/1993 |

* cited by examiner

Primary Examiner—John Sheehan
Assistant Examiner—Andrew L. Oltmans
(74) Attorney, Agent, or Firm—Garvey, Smith, Nehrbass & Doody, L.L.C.; Seth M. Nehrbass

(57) ABSTRACT

A corrosion-resistant coating for aluminum alloys preferably includes lithium molybdate and cerium. A conversion coating has been developed for aluminum surfaces that can substitute for the conventional chromate containing conversion coating. This new coating contains compounds such as lithium molybdate and cerium. The initial process consisted of two steps. Coated surface was tested to ASTM B117 requirement for 168 hours, showing little corrosion. Paint adhesion tests were also conducted with good results. Subsequent tests indicated that one step is adequate, but additional tests are needed.

8 Claims, No Drawings

CHROMIUM-FREE CONVERSION COATING

CROSS-REFERENCE TO RELATED APPLICATIONS

Priority of my U.S. Provisional Patent Application Ser. No. 60/120,611, filed Feb. 19, 1999, incorporated herein by reference, is hereby claimed.

STATEMENT REGARDING FEDERALLY SPONSORED RESEARCH OR DEVELOPMENT

The government may have rights in this invention, as it was made in performance of work under Office of Naval Research Cooperative Agreement No. N00014-94-2-0011.

REFERENCE TO A "MICROFICHE APPENDIX"

Not applicable

BACKGROUND OF THE INVENTION

1. Field of the Invention

The present invention relates to coatings for aluminum alloys. More particularly, the present invention relates to corrosion-resistant coatings for aluminum alloys.

2. General Background of the Invention

A good background of the invention can be found in the paper entitled "Chromium Free Conversion Coating for Aluminum" and attached to U.S. Provisional Patent Application Ser. No. 60/120,611 which paper is incorporated herein by reference.

Also incorporated herein by reference are International Publication No. WO 99/41305, International application no. PCT/US99/03470, and U.S. patent application Ser. No. 09/236,482 now U.S. Pat. No. 6,069,197.

BRIEF SUMMARY OF THE INVENTION

The apparatus of the present invention solves the problems confronted in the art in a simple and straightforward manner. What is provided are corrosion-resistant coatings for aluminum alloys including lithium molybdate and cerium and methods of applying these coatings to aluminum alloys.

BRIEF DESCRIPTION OF THE TABLES

Table 1 Forming chemical film with lithium salts; and

Table 2 Cerium chloride coating solution.

DETAILED DESCRIPTION OF THE INVENTION

Methods of protecting aluminum and its alloys from corrosion, which are based on the production of a chemical conversion coating, have been known for some time. They are now of great industrial significance, both as coatings in their own right and as a pretreatment before application of organic coatings. A conversion coating should have at least two properties: corrosion protection and providing a good surface for adhesion of paint to the aluminum surface.

The chromate conversion coating of aluminum has been used for many years and provides good protection against corrosion. However, chromium has been reported carcinogenic and causes many environmental problems. The environmental agencies limit the amount of chromium ion tolerated in waste water to less than one part per million. An environmentally benign replacement is being sought.

A series of studies has reported that there are several elements, such as lithium, cerium and molybdate, that can passivate the aluminum substrate substantially, and they can be used as corrosion inhibitors to protect the aluminum alloys.

Buchheit and his co-workers [1] reported that lithium carbonate in alkaline solution protects certain metals, particularly aluminum, from corrosion by reacting with the metal substrate and form a thin chemical film. In our previous corrosion resistant primer project [2], a variety of lithium salts, such as lithium molybdate, lithium nitrate, lithium carbonate etc were selected as pigments in the primer. All of these salts of lithium can passivate the substrate to some extent. The lithium carbonate produces "talcite" according to Buchheit. This material does not allow the organic topcoat to bond well.

Recent work [3] has shown that rare earth elements, in particular cerium, can provide corrosion resistance comparable to chromates. The mechanism of inhibition is thought to involve a decrease in the rate of the cathodic reaction. At sites where the cathodic reaction predominates, the local pH value increases to the point where cerium hydroxide can precipitate on the surface. As this process continues, a hydrated cerium oxide film is formed which stifles further cathodic reaction.

Molybdate is also a good inhibitor that improves the pitting resistance of aluminum and its alloys. The improvement in pitting resistance is believed to be associated with a molybdate-rich region on the film surface that inhibits the ingress of chlorine anions to the metal/film interface. [4]

Copper is the metal that reduces the corrosion resistance of aluminum more than any other alloying elements. It leads to a higher rate of uniform corrosion and a greater incidence of pitting corrosion. However, since aluminum alloys with copper have good mechanical properties, it is widely used as the main material in ship building alloy of aluminum. Alloy 2024 is one with high copper content and therefore it has become the focus of our experiments (those of me and my assistants).

So far, several methods of forming non-chromium conversion coatings have been found and they show good results in some respects. However, most of them are either not adequate for some type of aluminum alloy (such as high-copper aluminum alloy) or the procedures are not practical in industry. It is our goal to find a chemical conversion coating which has the following properties:

Environmental acceptability;

Good corrosion resistance;

Good adhesion to surface;

Compatibility with paint;

Ease of handling (no heating, no electrical anodizing); and

No effect on substrate material.

Objective

This project is focused on developing a chromium-free conversion coating or chemical film for aluminum surfaces.

The main goal is to find a method to form a conversion coating on the aluminum alloys that can substitute for the conventional chromate containing conversion coating. This new coating will be required to pass ASTM corrosion tests and to exhibit satisfactory physical properties as a coating base. The coating formation process should be environmentally acceptable and easy to handle in manufacturing.

Scope

The scope of this project was limited to demonstrating in the laboratory a substitute for the chromium containing chemical film for corrosion protection of aluminum. Samples were sent as required to other labs but no field testing or manufacturing was done.

A sub-task was to check spray equipment for the lithium paint developed under GCRMTC-Research Project No. 1 ("Inexpensive Non-Toxic Pigment Substitute for Chromium in Primer for Aluminum Substrate"—Cooperative Agreement No. N00014-94-2-0011, awarded by the Office of Naval Research), the results of which are discussed in International Publication No. WO 99/41305, International application no. PCT/US99/03470, and U.S. patent application Ser. No. 09/236,482 now U.S. Pat. No. 6,069,197.

Method of Procedure
Hydrotalcite Chemical Film

Buchheit [1] and his co-workers found a way to form a chemical film in alkaline lithium carbonate solution. The film is formed. on aluminum during a 15 minute exposure to a mixed lithium carbonate-sodium aluminate solution at pH 11.5. The film is a compound which belongs to the hydrotalcite mineral family. This process is followed by a further deposition of the hydrotalcite coating in an aqueous neutral or acid metal salt solution with the metal salt chosen from Co, Ni, Fe, Mn, etc.

We started our experiments by imitating the above mentioned process Results showed that although this chemical film greatly improved the corrosion resistance of aluminum alloy, it was not sufficient for high copper aluminum alloys and the hydrotalcite chemical film was found incompatible to the top paint.

However, the film formation process is simple and can be conducted at room temperature. Improvements on this process are expected to be able to produce more corrosion resistant chemical film.

Other Approaches Tried

As in an experiment of exploring nature, there are so many failures towards the final discovery. At the early stage of our project, we also made many detours.

One of the detours was trying to use polyacrylic acid as sealant to the chemical film. The idea is that polyacrylic acid can polymerize under certain conditions on the metal surface and thus fill the porosity in the chemical film. It was also believed that polyacrylic acid enhanced the paint adhesion to the chemical film due to stronger affinity among organic compounds. Chemical films which were formed on Al 2024 T3 panels with process similar to the Buchheit experiment were immersed in 10% Allied Colloids Inc. Glascol E9 (polyacrylic acid) and the acid did polymerize on the surface. However, the polymer does not improve the corrosion resistance sufficiently. A zirconium compound was used as a cross-linker in an attempt to facilitate better coagulation of polyacrylic resin. But unfortunately, little improvement was shown.

Formulas were also made to incorporate cerium into the chemical film. Ce(III) is known for its tendency to precipitate as an oxide or hydroxide at defect sites in oxide coatings. Al 2024 T3 panels with chemical films were immersed in CeCl3 or Ce(NO3)3 solutions. However, simply dipping the alloys in these solutions without additives did not improve the corrosion resistance.

Forming Chemical Film with Lithium Salts

Experiments were performed both on Al 3003 H14 (low copper) and Al 2024 T3 (high copper) panels with different lithium salts, such as lithium sulfate, lithium polysilicate, lithium perchlorate, lithium molybdate, lithium benzoate, etc. (see table 1). Most of the lithium salts can be used to form a chemical film, which can passivate the aluminum alloy to some extent. Some have better effects than others. These films are not hydrotalcite.

In these experiments, we found that the corrosion resistant effect of the chemical film is sensitive to the pH level of the coating solution. This is especially true in the case of high copper alloy. The best corrosion resistance is only achieved within a certain pH range. Different lithium salts have different optimal pH range for chemical film formation. For the preferred lithium salt of the present invention, lithium molybdate, the optimal pH range (at a temperature of about 20° C.) for chemical film formation for Al 2024, 3003, 5052, 6001, and perhaps all 2000, 3000, 4000, 5000, and 6000 series aluminum alloys is around 10.25–10.85, and preferably 10.5–10.75. The optimal pH range for chemical film formation for lithium molybdate (at a temperature of about 20° C.) for Al 7075, and perhaps other 7000 series aluminum alloys is 10.00–10.50, and preferably 10.20–10.30.

Lithium Molybdate Coating Solution

Comparison made between the best chemical films formed with different lithium salts within their respective optimal pH ranges showed that samples treated with lithium molybdate had better corrosion resistance than those treated with other lithium compounds. The alkalinity of the coating solution is important. The pH should be controlled within the range between 10.0 and 11.0 (at a temperature of about 20° C.).

Panels of different aluminum alloy types treated with lithium molybdate coating solution were tested according to ASTM B117 salt spray test. Corrosion were still found on the panels after test, especially on the Al 2024 T3 panels.

Cerium-containing Coating Solution

Al 2024 T3 panels treated with lithium molybdate as described above were further treated in CeCl3 coating solution. This time a very weak solution of hydrogen peroxide was used to accelerate the precipitation of cerium onto the alloy surface. Extensive experiments were done with variations on concentration of $CeCl_3$, amount of $H_2O_2$ as well as the time period of the treatment. Results showed that the second step treatment in $CeCl_3$ solution with 1.5% $H_2O_2$ as catalyst could greatly increase the corrosion resistance of the Al 2024 T3 alloy (see Table 2). The amount of $H_2O_2$ added and the time of immersion have a critical impact on the film quality. Same experiments were made on Al 3003 H14 panels with similar results.

Preferably, one adds 3–5 ml of 1.5% $H_2O_2$ per 250 ml of 0.01M $CeCl_3$ and treats for about 5–15 minutes; more preferably, one adds about 4 ml of 1.5% $H_2O_2$ per 250 ml of 0.01M $CeCl_3$ and treats for about 10 minutes for Al 7075 alloy and perhaps other 7000 series Al alloys, and 15 minutes for other aluminum alloys (1000, 2000, 3000, 4000, 5000, 6000 series Al alloys).

Treatment by Brushing

Panels were treated with the two steps mentioned above by brushing instead of dipping. Due to the difference in amount of solutions around the substrate between brushing and dipping, higher concentrations of chemicals are expected to produce better chemical film. The concentration of lithium molybdate, cerium chloride and hydrogen peroxide were doubled in the test of brushing approach. For the first step, the pH value of the lithium molybdate solution were adjusted to 11.0 instead of 10.5 which was in the case of immersion. The first step treatment makes the cerium compound more readily precipitate out on the alloy surface.

The second step treatment is critical to the corrosion resistance of the chemical film. Cerium chloride solution was added with diluted hydrogen peroxide and was immediately brushed onto the alloy surface. Brushing the surface with the cerium chloride solution for a second time makes the surface well covered with cerium compound. (Note: the cerium chloride solution should be brushed onto the alloy surface immediately after the hydrogen peroxide is added. Preferably the solution should be brushed within 30 minutes after the hydrogen peroxide is added.)

Summary of Procedure

Example of a Surface Pretreatment

1. Polish the sample surface with preferably #600 sandpaper to remove aluminum oxides.
2. Wash the sample with an alkaline cleaner (household detergent is suitable.).
3. Rinse the sample for 2 minutes, preferably with deionized water.
4. Immerse or brush the sample in 15% nitric acid (HNO3) for 2 minutes.
5. Rinse the sample again for 2 minutes, preferably with deionized water.

One way to check whether the surface has been properly pretreated is that there should be no break of water when the surface is rinsed (water break free).

Example of Treating the Alloy by Immersion

First Step Treatment

1. Prepare the lithium molybdate coating solution as follows:

Lithium molybdate 0.01 M

Adjust pH to 10.5 to 10.75 with LiOH *

(pH is measured at 20° C.)

Note: NaOH is not preferred, since LiOH introduces more Li+ into solution and Li+ tend to form lithium aluminate complex compound and precipitates out. Na+ has no such effect.

2. Immerse the pre-treated alloy into the above solution. Gas will evolve during the process. For the formation of a more uniform coating, periodic removal of the bubbles is required, which can be achieved by agitating the solution or by softly brushing away the bubbles from the surface.
3. Immerse the alloy for about 2 hours (though any time between about 1.5 hours and 3 hours should be sufficient).
4. Take out the alloy and rinse it.

Second Step Treatment

1. Prepare the cerium containing coating solution as follows:
    1) Cerium chloride 0.01 M
    2) For every 250 mL 0.01 M cerium chloride solution, add 4 mL 1.5% $H_2O_2$.
2. Immerse the first-step treated alloy into the above cerium chloride. solution immediately (preferably within 30 minutes after the $H_2O_2$ is added), keep the panel in the solution for 10 minutes for Al 7075 alloy and perhaps other 7000 series Al alloys, and 15 minutes for other aluminum alloys (1000, 2000, 3000, 4000, 5000, 6000 series Al alloys).
3. Take out the alloy and rinse it.

Example of Treating the Alloy by Brushing

First Step Treatment

1. Prepare the lithium molybdate coating solution as follows:
    1) Lithium molybdate 0.02 M
    2) Adjust pH to 11.0 at 20° C. using LiOH
2. Brush the pre-treated alloy with the above solution thoroughly.
3. Brush the alloy with the solution for 3 or 4 times in a total time period of about 1 hour. Brush more frequently at the beginning to prevent bubbles from getting trapped.
4. Rinse the alloy with distilled water.

Second Step Treatment

1. Prepare the cerium containing coating solution as follows:
    1) Cerium chloride 0.02 M
    2) for every 100 mL 0.02M cerium chloride solution, add 4 mL 1.5% $H_2O_2$.
2. Brush the alloy immediately (preferably within 30 minutes after the $H_2O_2$ was added to the solution) with the above solution thoroughly, keeping the alloy surface wet with the solution for about 20 minutes for Al 7075 alloy and perhaps other 7000 series Al alloys, and about 45 minutes for other aluminum alloys (1000, 2000, 3000, 4000, 5000, 6000 series Al alloys).
3. Repeat 1 and 2 for a second time.
4. Rinse the alloy with deionized water.

Performance Testing

Corrosion Resistance

Alloys of both the high-copper type (Al 2024-T3) and the low-copper type (Al 3003 H14, Al 6061 T6) were treated by the above mentioned Li—Mo—Ce conversion coating processes, and were exposed to a salt spray environment for 168 hours per ASTM B117. [6] Some of the important parameters of the ASTM B117 corrosion test are as follows:

Electrolyte solution: 5% sodium chloride

Solution Acidity: pH between 6.5 and 7.2

Fog temperature: 35° C.

Exposure period: 168 hours

Paint Adhesion

The paint adhesion test was conducted in the following way: Painted panels were immersed in distilled water for 24 hours, then removed to ambient air. Scribe marks which all scatter from the same point were made deep into the substrate using a sharp knife. Adhesive tape with a minimum adhesive strength of 35 lbs. was then firmly stuck over the scribes and then immediately removed. If any paint was removed as the tape was withdrawn, the panel was given a fail ranking. If no paint was removed the panel was given a pass ranking.

Subtask: Spray Application of Primer

Corrosion resistant non-chromate primers were prepared according to the following ingredients:

| | |
|---|---|
| Aluminum lithium powder | 115.0 g |
| MICA (preferably 320 mesh) | 15.0 g |
| $Li_2MoO_4$ | 1.0 g |
| $Na_2B_4O_7*10H_2O$ | 0.8 g |
| Lithsil-6 | 200 mL |

Lithsil is a Trademark of FMC for Lithium Silicate

Spray application of the non-chromate primers was conducted using a conventional spray cup. The pressure was adjusted to as high as 120 psi. Variations were made on the amount of Lithsil-6 to make the primer either thinner or thicker. However, the spray equipment was found not suitable due to the precipitation of the aluminum-lithium powder.

Spray equipment which can agitate the mixed material continuously during the process was found suitable. The cup has dual regulators (⅜" I.D. minimum material hose, 50" maximum material hose), 070" I.D. fluid tip. If the spray stops for more than 10 minutes, recirculate the material remaining in the spray line.

The spray can also be conducted with airless spray gun. The required parameters are:

Pump ratio: 30:1 (min.)

GPM output: 3.0 (min.)

Material hose: ⅜"I.D.(min.)
Tip size: 0.019–0.023"
Output psi: 1500–2000
Filter size: 60 mesh Increasing the Lithsil-6 amount in the primer can improve the integrity of the film.

Discussion of Results pH and Chemical Film

The pH value of the coating solution is extremely important to the quality of the chemical film. Chemical films formed in high pH may seem good in terms of appearance, but are actually less effective than films formed in less alkaline solutions. The more alkaline the coating solution, the longer it takes the lithium aluminum complex compound to precipitate and form a chemical film. This may not be a big problem for alloys of low copper content. But for those of high copper content, the surface will quickly become enriched with a variety of copper compounds, which is referred to as "smut"[1]. The copper "smut" interferes with the conversion coating formation, leading to the stopping of the process prematurely. Moreover, the "smut" rich surface may increase the vulnerability of the alloy to corrosion as a result of the galvanic coupling of the aluminum with the "smut".

On the other hand, when the coating solution is not alkaline enough, the conversion coating reaction may not happen at all and the chemical film does not form. Therefore, the pH value of coating solution should be carefully controlled within a certain range so that the best effect of corrosion resistance is obtained. Different lithium salt solutions have different optimal pH range. Table 1 shows the experiments which test the optimal pH ranges of several lithium salt coating solutions.

Lithium Molybdate as Coating Solution

From our experiments, we were unable to confirm the conclusion made by Mr. Buchheit in one of his papers [1] that the kind of anion in the lithium salt is not important in determining the passive film formation. Our early-stage research demonstrated that the molybdate compound can passivate the substrate of the aluminum alloy and it is especially effective in preventing pitting corrosion. A series of experiments have were conducted, using different lithium compounds in the coating solution with moderate alkalinity (see Table 1). ASTM tests showed that samples treated with lithium molybdate at pH within the range between 10.5 and 10.75 (at room temperature of 20° C.) have the best corrosion resistance. It is believed that the pH can vary (at room temperature of 20° C.) from about 10.25–10.85, and perhaps even from about 10.0–11.0. The concentration of lithium molybdate around 0.01 M is found adequate for film formation, though one could use a concentration of lithium molybdate around 0.005–0.1 M, preferably around 0.0075–0.02 M, and most preferably around 0.01–0.015 M.

Hydrogen Evolution in the Process

The evolution of hydrogen bubbles during the above-mentioned process is not particularly rigorous. However, the bubbles are prone to be trapped at certain spots which interferes with the reaction and results in defects which will be easily attacked by the corrosive environment. Therefore, periodic removal of the hydrogen bubbles from the metal surface is essential. This can be achieved either by agitation of the solution or by brushing away the bubbles from the surface. Cerium containing coating solution A cerium compound was selected for further treatment of the half-finished alloys mentioned above. Cerium tends to precipitate with molybdate anions and alkaline solution. Therefore, a separate second step to incorporate cerium into the film is necessary.

Immersion of the aluminum alloy in a solution containing 1000 ppm CeCl3 for periods of several days (more than one week) can increase the pitting potential and reduce the corrosion rate. [5] But the process is too long to be applicable in manufacturing. Some other methods which require much shorter periods of time involve treating the metal in cerium solution at a temperature of at least about 80° C. [6] These methods also have limited applicability in manufacturing due to the requirement of high temperature. Extensive literature search showed that the protective action of cerium is due to the formation of a film containing cerium oxide/hydroxide with cerium in the oxidation state of both 3 and 4. A very dilute solution (1.5%) of Hydrogen peroxide, an oxidizing agent, was added to the cerium chloride solution to accelerate the oxidation process of cerium from 3 valence to 4 valence. The 4 valence cerium compound will precipitate on the alloy surface. Initial results showed that a film enriched with 4 valence cerium compound can be formed rapidly (in about an hour) in this way and the corrosion resistance is greatly improved. The amount of hydrogen peroxide and time of immersion were found to have great impact on the film quality. (Table 2). Experiments were conducted to optimize the ingredients of the cerium containing coating solution.

ASTM B117 tests showed that the second step treatment of aluminum alloys in 0.01 M cerium chloride solution with tiny amount of hydrogen peroxide can greatly enhance the corrosion resistance of the alloy.

The effectiveness of the cerium chloride treatment does not nullify the necessity of the lithium molybdate treatment. Surfaces of panels treated only with cerium chloride are erratically covered with chemical film and are thus hardly corrosion resistant.

Result of the Paint Adhesion Test

The panels were scribed and pulled with making tape having 35 lb/square inch adhesion. The results were verified. A comparison was made between the hydrotalcite and our Li—Mo—Ce chemical films. Aluminum surfaces with hydrotalcite chemical film showed poor adhesion to the paint. Some paint was peeled off during the test. In fact, the paint can be easily scraped off using fingernails.

Result of the Corrosion Test

An Al 2024 T3 panel having a size of 150 square inches was treated with the lithium molybdate and cerium chloride coating solution by dipping. Then it was tested in a salt fog cabinet for 168 hours according to ASTM B 117 specification. Only one pit and some dark water marks were found close to the edge of the panel. Corrosion at edges is not regarded as test failure because edges are not smooth and thus chemical film forms poorly at those places.

An Al 3003 H14 panel having a size of 24 square inches was also tested. No corrosion was found after the test.

Al 2024 T3 and Al 3003 H14 panels having a size of 24 square inches were treated with lithium molybdate and cerium chloride by brushing. The untreated edges had been covered with decal to eliminate edge corrosion before they were tested according to ASTM B117. No corrosion was found after the test.

CONCLUSION

A chemical film which involves precipitation of lithium molybdate and cerium on aluminum alloy surfaces has been found. The film can be formed by both immersion and brushing at room temperature. Different aluminum alloys, including both low copper content and high copper content, were treated with the chemical film and were tested according ASTM B117. Corrosion resistance of the alloys was greatly enhanced by the chemical film. The chemical film also shows good adhesion to top paint.

TABLE 1

Forming chemical film with lithium salts

| No. | Alloy | Solution | pH | ASTM B117 Test |
|---|---|---|---|---|
| 1 | 2024 T3 | Lithium Sulfate | 11.5 | general corrosion |
| 2 | 2024 T3 | Lithium Sulfate | 11.0 | less corrosion |
| 3 | 2024 T3 | Lithium Sulfate | 10.5 | less corrosion, only water marks at edges |
| 4 | 3003 H14 | Lithium Sulfate | 11.5 | surface turned dark, general corrosion |
| 5 | 3003 H14 | Lithium Sulfate | 11.0 | surface turned dark, general corrosion |
| 6 | 3003 H14 | Lithium Sulfate | 10.5 | surface turned dark, general corrosion |
| 7 | 2024 T3 | Lithium polysilicate | 11.5 | severly corroded, bad |
| 8 | 2024 T3 | Lithium polysilicate | 11.0 | severly corroded, bad |
| 9 | 2024 T3 | Lithium polysilicate | 10.5 | corroded, bad |
| 10 | 2024 T3 | Lithium Perchlorate | 11.5 | much dark water marks across the panel |
| 11 | 2024 T3 | Lithium Perchlorate | 11.0 | much dark water marks at edges |
| 12 | 2024 T3 | Lithium Perchlorate | 10.5 | dark water marks at edges |
| 13 | 3003 H14 | Lithium Perchlorate | 11.5 | surface significantly turned dark |
| 14 | 3003 H14 | Lithium Perchlorate | 11.0 | surface turned dark, general corrosion |
| 15 | 3003 H14 | Lithium Perchlorate | 10.5 | less corrosion than No. 11 |
| 16 | 2024 T3 | Lithium Benzoate | 11.5 | some parts turned dark, much corrosion |
| 17 | 2024 T3 | Lithium Benzoate | 11.0 | less corrosion than No. 13 |
| 18 | 2024 T3 | Lithium Benzoate | 10.5 | same as No. 14 |
| 19 | 3003 H14 | Lithium Benzoate | 11.5 | surface turned significantly dark |
| 20 | 3003 H14 | Lithium Benzoate | 11.0 | surface turned dark |
| 21 | 3003 H14 | Lithium Benzoate | 10.5 | surface turned dark |
| 22 | 2024 T3 | Lithium Molybdate | 11.5 | som parts have water marks, yet they are less dark than those on No. 10, 11 & 12 |
| 23 | 2024 T3 | Lithium Molybdate | 11.0 | less water marks than No. 22 |
| 24 | 2024 T3 | Lithium Molybdate | 10.5 | less corrosion than No. 23 |
| 25 | 2024 T3 | Lithium Molybdate | 10.2 | more corrosion than No. 24 |
| 26 | 3003 H14 | Lithium Molybdate | 11.5 | surface turned dark |
| 27 | 3003 H14 | Lithium Molybdate | 11.0 | good |
| 28 | 3003 H14 | Lithium Molybdate | 10.5 | good |
| 29 | 3003 H14 | Lithium Molybdate | 10.2 | more corrosion than No. 25 |

Note:
The panels were treated in alkaline lithium salt solution by immersion.

TABLE 2

Cerium Chloride Coating Solution

| No. | Cerium Chloride | $H_2O_2$ (1.5%) in 250 mL solution | Immersion Time | ASTM B117 Test Result |
|---|---|---|---|---|
| 1 | 0.01 M | 1 mL | 1 hr. | some corrosion |
| 2 | 0.01 M | 1 mL | 2 hr. | some corrosion |
| 3 | 0.01 M | 1 mL | 4 hr. | better than No. 1 & 2 |
| 4 | 0.01 M | 2 mL | 1 hr. | some corrosion |
| 5 | 0.01 M | 2 mL | 2 hr. | some corrosion |
| 6 | 0.01 M | 2 mL | 4 hr. | better than No. 4 & 5 |
| 7 | 0.01 M | 4 mL | 1 hr. | no corrosion |
| 8 | 0.01 M | 4 mL | 2 hr. | little corrosion |
| 9 | 0.01 M | 4 mL | 4 hr. | pitting corrosion |

Note:
These tests were done on Al 2024 T3 panels after being treated in lithium molybdate coating solution.
The panels were treated by immersion.

The present invention is described in the paper entitled "Chromium Free Conversion Coating for Aluminum" and attached to U.S. Provisional Patent Application Ser. No. 60/120,611. It might be more appropriate to call the present invention a "surface treatment" since the coating alters the surface of the aluminum alloy article.

Chem Film for Al 7075 and Perhaps Other 7000 Series Al Alloys $1^{st}$ step:

1) Lithium Molybdate (Li2MoO4) solution 0.01 M.

Add E9 (a trademark of Allied Colloids Inc. for polyacrylic acid) 40 mL in every 2000 mL Lithium Molybdate solution.

Adjust pH to 10.25 with Lithium Hydroxide. (LiOH)

Heat the solution to about 85° C.

Immerse the alloy in the above solution for about 8 hours.

Take out the alloy and rinse it in deionized water.

$2^{nd}$ step:

For every 250 mL 0.01 M CeCl3 solution, add 4 mL 1.5% $H_2O_2$, i.e., for 2000 mL CeCl3 solution, we need 1.6 mL 30% $H_2O_2$.

Immerse the panel for about 10 minutes.

Take out the alloy and rinse it in deionized water.

Chem Film for Al 2024, Al 3003, and Other 1000, 2000, 3000, 4000 (Not Tested, but I Believe that it Would Work), 5000, 6000 Series Al alloys $1^{st}$ step:

1) Lithium Molybdate (Li2MoO4) solution 0.01 M.

Adjust pH to 10.5 to 10.75 with LiOH (pH is measured at about 20° C.)

Immerse the alloy into the above solution. Gas will evolve during the process. For the formation of a more uniform coating, periodic removal of the bubbles is required, which can be achieved by softly brushing away the bubbles from the surface.

Immerse the alloy for about 2 hours

Take out the alloy and rinse it in deionized water.

$2^{nd}$ step:

For every 250 mL 0.01 M CeCl3 solution, add 4 mL 1.5% $H_2O_2$ i.e., for 2000 mL CeCl3 solution, we need 1.6 mL 30% $H_2O_2$.

Immerse the panel for about 15 minutes.

Take out the alloy and rinse it.

The invention can be used with 5000 series Al alloys and 6000 series Al alloys.

Epoxy Primers for Steel Panel (by Brushing)
1) Use the following ingredients as a guide:

| | |
|---|---|
| Epoxy3 | 15 mL |
| LiH$_2$PO$_4$ | 4 g (Grinding the LiH$_2$PO$_4$ to 320 mesh is preferred.) |
| Al-Li powder (at least 200 mesh) | 9 g |

2) Mix the above ingredients thoroughly.
3) Add 15 mL of curing agent and mix thoroughly.
4) Wet the pH paper and measure the pH of the above mixture. Make sure the pH is at 7 or 8.
5) Brush the primer onto the steel panel, which should be cleaned first.
6) Painting the panel using draw-bar-coater has not been tried. For this to be possible, the LiH$_2$PO$_4$ must be very fine.
1) The procedure of cleaning the steel panel: (a) abrade the panel with 200 and then 400 sandpaper; (b) wash the panel with detergent; (c) Take out and rinse it.
Note
1) The ingredients have not been optimized yet. The panel thus pre-treated can undergo ASTM B117 test for 6 days. Expected variations that may improve the anti-corrosion property of the coatings are (a) adding more LiH$_2$PO$_4$, (b) grinding the LiH$_2$PO$_4$ into finer powder, (3) adding more Al—Li powder.
Epoxy3 is an epoxy, which is provided by Euro Navy, which comprises an epoxy/polyamide structure (though other epoxies, with variations in molecular weight and polymer structure, could be used). The curing agent, which is provided by Euro Navy, comprises polyamide (though other curing agents, such as amine adducts and amines, could be used).
Ingredients of Paint for Steel
Epoxy 30 ml
Curing Agent 30 ml (polyamide or amine adduct)
LiH$_2$PO$_4$ 6 g (powder 325 mesh)
2090 Al—Li Powder 22 g (heated to move lithium to surface) (325 mesh)
Mix thoroughly and coat at 2–4 mils,
Cure for 2 days or cure at elevated temperature.
The aluminum lithium pigment provides two corrosion resisting mechanisms on aluminum. First, it passivates the aluminum substrate. Secondly, it provides galvanic protection. On steel, however, the aluminum lithium does not passivate and the alkaline nature of the lithium is too strong. It must be neutralized. A good neutralizer is lithium monobasic phosphate. It is a good source of acid to neutralize the aluminum lithium powder which is normally 10 to 11.5 pH to a more neutral 5 to 9. If one uses aluminum lithium in an epoxy system, the galvanic protection is not adequate to prevent alkali attack at this pH. The lithium phosphate is very slightly soluble and hence will not rapidly dissolve. Therefore, it is not leached out of the system during exposure. The above formula with a pH of about 7 will galvanically protect steel. This system has passed the ASTM 117-B test for 176 hours.

All measurements disclosed herein are at standard temperature and pressure, at sea level on Earth, unless indicated otherwise. All materials used or intended to be used in a human being are biocompatible, unless indicated otherwise.

REFERENCES

[1] R. G. Buchheit, C. A. Drewien, M. A. Martinez, Chromate-Free Corrosion Resistant Conversion Coatings For Aluminum Alloys, Sandia National Laboratories;

[2] A. F. Daech, University of New Orleans, "Environmentally Acceptable Corrosion Resistant Coating For Aluminum Alloys", Paper presented at the 1997 Ship Production Symposium, Apr. 21–23, 1997;

[3] A. J. Davenport, H. S. Issacs and M. W. Kehdig-Xanes, "Investigation Of The Role of Cerium Compounds As Corrosion Inhibitors For Aluminum," Brookhaven National Laboratory, Upton, N.Y. 11973, U.S.A.;

[4] W. C. Moshier and G. D. Davis, "Interaction of Molybdate Anions with the Passive Film on Aluminum," Corrosion—January 1990;

[5] MIL-C-5541E, "Chemical Conversion Coatings on Aluminum and Aluminum Alloys" Rev. November, 1990;

[6] ASTM B117, "Standard Method of Salt Spray (Fog) Testing" ASTM, Philadelphia, Pa., 1990;

[7] J. D. Gorman et al., "The Characterisation of Ce—Mo-Based conversion coating on al-alloys: part II", Corrosion Science, Vol 38, 1996;

[8] H. P. Godard, "An insight into the corrosion behavior of aluminum", 1981;

[9] Mansfeld, F. B. et al., "Method for creating a corrosion-resistant surface on aluminum alloys having a high copper content", U.S. Pat. No. 5,582,654;

[10] Katsushige Ikeda et al., "Process for forming resinous films on anodized aluminum substrates", U.S. Pat. No. 3,775,266 (1973).

The foregoing embodiments are presented by way of example only; the scope of the present invention is to be limited only by the following claims.

What is claimed is:

1. An aluminum alloy article having a corrosion-resistant coating comprising lithium molybdate and cerium, wherein the lithium molybdate has been applied to the alloy, and then cerium has been applied to the lithium molybdate coated alloy.

2. The aluminum alloy article of claim 1, wherein the lithium molybdate and cerium are applied at a pH, measured at about 20° C., of about 10–11.

3. The aluminum alloy article of claim 1, wherein the lithium molybdate and ceruim are applied at a pH, measured at about 20° C., of about 10.5–11.

4. The aluminum alloy article of claim 1, wherein the lithium molybdate and cerium are applied by dipping the alloy article at a pH, measured at about 20° C., of about 10–11.

5. The aluminum alloy article of claim 1, wherein the lithium molybdate and cerium are applied by dipping the alloy article at a pH, measured at about 20° C., of about 10.5–10.75.

6. The aluminum alloy article of claim 1, wherein the lithium molybdate and cerium are applied by brushing at a pH of about 10–11.

7. The aluminum alloy article of claim 1, wherein the lithium molybdate and cerium are applied by brushing at a pH of about 10.5–11.

8. The invention of claim 1, wherein the cerium is part of a four valence cerium compound.

* * * * *